Figure 1:
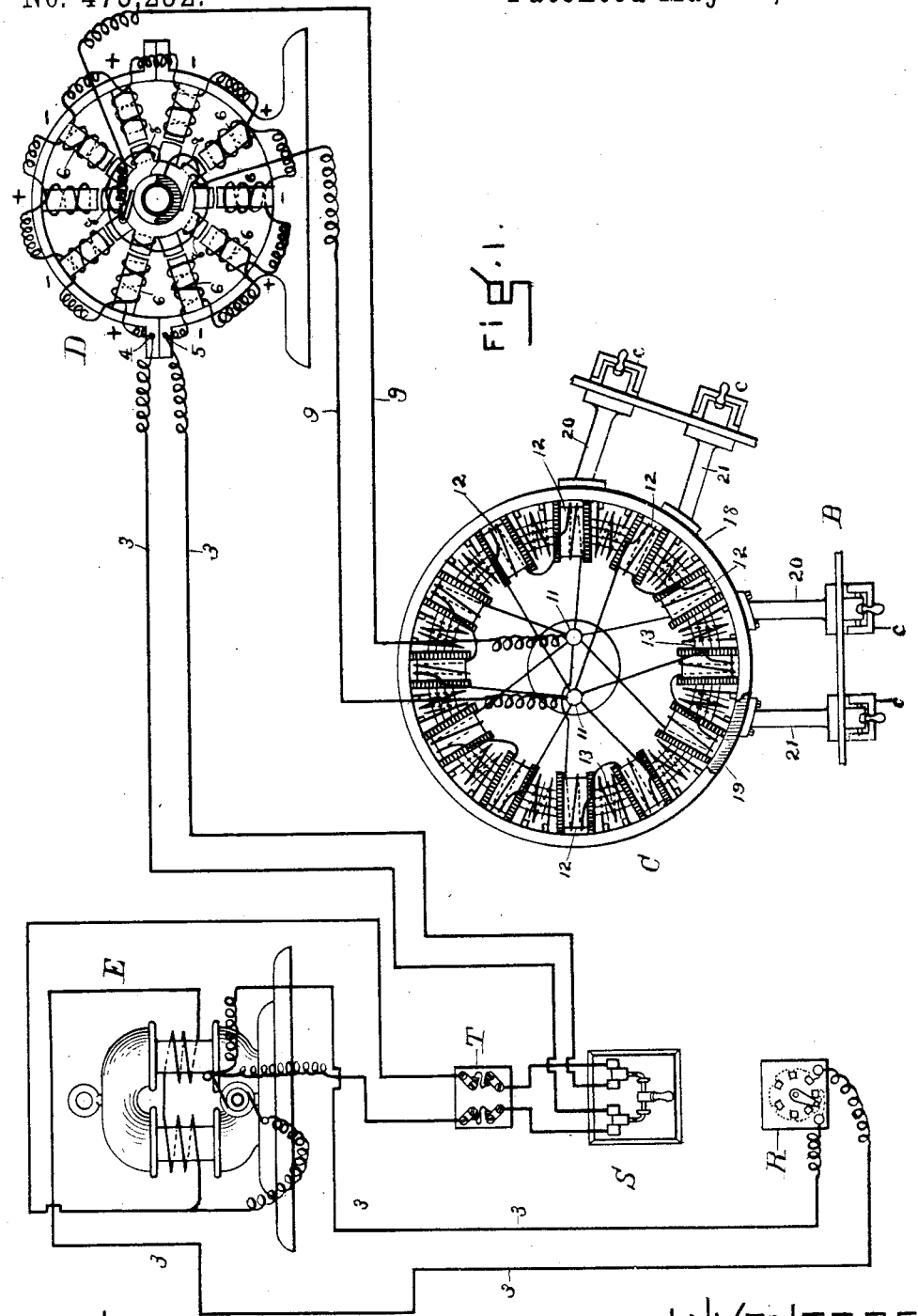

(No Model.) 6 Sheets—Sheet 1.
G. D. BURTON, A. H. EDDY & G. T. BRIGGS.
CONVERTING SYSTEM FOR ELECTRIC METAL HEATING.

No. 475,232. Patented May 17, 1892.

WITNESSES
INVENTORS (No Model.) 6 Sheets—Sheet 2.
G. D. BURTON, A. H. EDDY & G. T. BRIGGS.
CONVERTING SYSTEM FOR ELECTRIC METAL HEATING.
No. 475,232. Patented May 17, 1892.

(No Model.) 6 Sheets—Sheet 4.

G. D. BURTON, A. H. EDDY & G. T. BRIGGS.
CONVERTING SYSTEM FOR ELECTRIC METAL HEATING.

No. 475,232. Patented May 17, 1892.

WITNESSES.

INVENTORS.

(No Model.) 6 Sheets—Sheet 5.
G. D. BURTON, A. H. EDDY & G. T. BRIGGS.
CONVERTING SYSTEM FOR ELECTRIC METAL HEATING.
No. 475,232. Patented May 17, 1892.
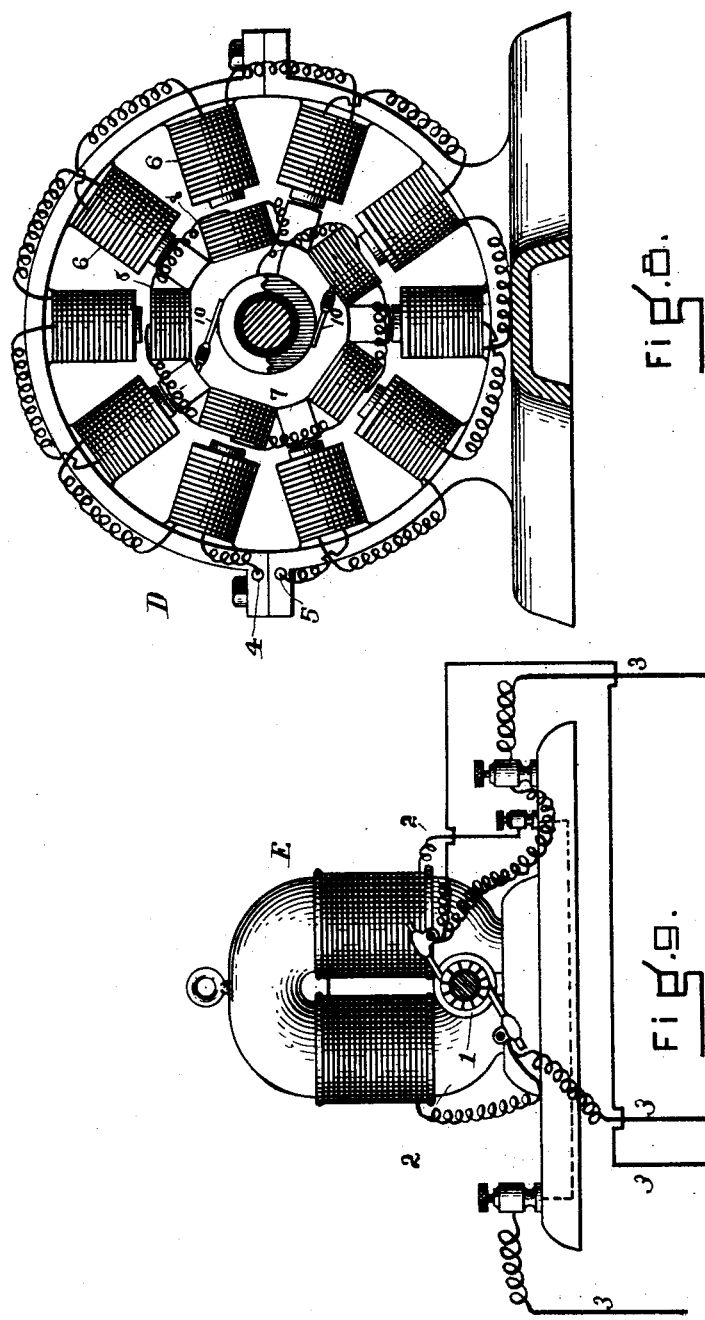
WITNESSES
INVENTORS (No Model.) 6 Sheets—Sheet 6.

G. D. BURTON, A. H. EDDY & G. T. BRIGGS.
CONVERTING SYSTEM FOR ELECTRIC METAL HEATING.

No. 475,232. Patented May 17, 1892.

WITNESSES

INVENTORS

UNITED STATES PATENT OFFICE.

GEORGE D. BURTON, OF BOSTON, MASSACHUSETTS, AND ARTHUR H. EDDY, OF HARTFORD, AND GEORGE T. BRIGGS, OF WINDSOR, CONNECTICUT, ASSIGNORS TO THE ELECTRICAL FORGING COMPANY, OF MAINE.

CONVERTING SYSTEM FOR ELECTRIC METAL-HEATING.

SPECIFICATION forming part of Letters Patent No. 475,232, dated May 17, 1892.

Application filed September 15, 1891. Serial No. 405,751. (No model.) Patented in France October 23, 1891, No. 216,934; in Italy November 28, 1891, XXVI, 30,704, and LX, 216; in Spain March 4, 1892, No. 12,661, and in Belgium 1892, No. 96,915.

*To all whom it may concern:*

Be it known that we, GEORGE D. BURTON, of Boston, in the county of Suffolk and State of Massachusetts, and ARTHUR H. EDDY, of Hartford, and GEORGE T. BRIGGS, of Windsor, in the county of Hartford, State of Connecticut, have invented a new and useful Improvement in Electric Metal-Heating Machines, (for which we have obtained Letters Patent in France, No. 216,934, dated October 23, 1891; in Belgium, No. 96,915, dated ———— ———, 1892; in Italy, Registro Generale, Vol. 26, No. 30,704, Registro Attesti, Vol. 60, No. 216, dated November 28, 1891, and in Spain, No. 12,661, dated March 4, 1892,) of which the following is a specification.

Our improvement relates to electrical machines for heating metals preparatory to shaping, forging, or welding the same in the ordinary manner by hand or machine tools; and it consists in certain new and useful constructions and combinations of the several parts of the same, substantially as hereinafter described and claimed, whereby we are enabled to speedily and economically bring long and large bars of metal to a heat suitable to work or fashion them into the ultimate form desired.

Our construction of mechanism enables us to perform all the valuable heating effects of the smith's forge without its wastefulness and other disadvantages in working metals, and it also enables us to do work that could not be well performed by the aid of a forge.

Heretofore in attempting to heat metal bars by the direct action of the electric current a difficulty has arisen in one of two ways: First, a current of comparatively high potential but of low-heating power has been tried, which, although capable of being forced through the metal, gave small and comparatively slow heating effects, and as the heating of the metal progressed and its resistance proportionately increased it was found with the then-existing appliances practically impossible to control the heat so as to stop it at the right point. For example, if it was desired to raise iron or steel to a welding heat, when after a considerable time it was accomplished the heat could not be controlled, but ran much higher. The current-generating devices also heated so that continuous operation was impractical. On the other hand, when a current of small electro-motive force and great volume was tried it was found impossible to force it through any considerable length of iron or steel or other metals which it was attempted to raise to suitable heat to shape or work it, so as to produce such suitable heat for such shaping or working it. This was because the amount of current which can be forced through a metal rod or bar is equal to the potential divided by the rod's resistance, and when the resistance was increased by lengthening the rod or bar to any great degree the potential was insufficient to pass the heavy heating current, which was generated through the length of the rod or bar evenly, so as to bring it to a proper working heat. Besides this, the apparatus heated unduly in certain parts because of imperfect arrangement for conveying the heating-current to the rod or bar.

For the above reasons and others hereinafter stated the previous practical working of metals by the direct action of electricity has been substantially confined to such operations as electric welding where a very small length of metal was required to be heated, and it has been proposed to overcome these difficulties by connecting various parts of the length of a metal bar to be heated to the electric-generating mechanism in multiple arc, so that the currents shall have very little distance to traverse from one electrode to the other through the metal, and also by inclosing jackets to radiate the heat to the parts least heated by the action of the electric current, and also in other cases by the aid of other sources of heat, such as gas-burners, &c. By our apparatus, hereinafter described, we are enabled to heat metal bars of any cross-section up to one and one-half inches square and from twelve to eighteen inches long within one and one-half minutes and to continue to operate the machine in this work day after day as perfectly and continuously as an iron-heating forge is used. This is accomplished without undue heating of the electric connections or conduits of the mechanism, which would give rise to a loss of electric power. It is obvious that larger bars may be heated by increasing the size of the apparatus or allowing them to remain longer between the clamps.

Figure 2:
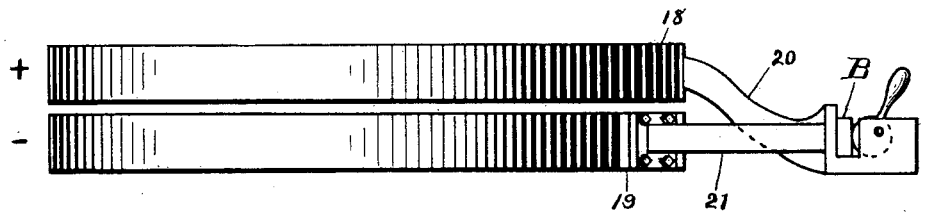
Figure 3:
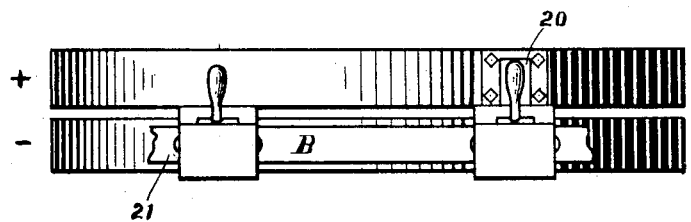
Figure 4:
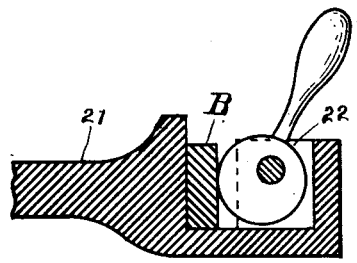
Figure 5:
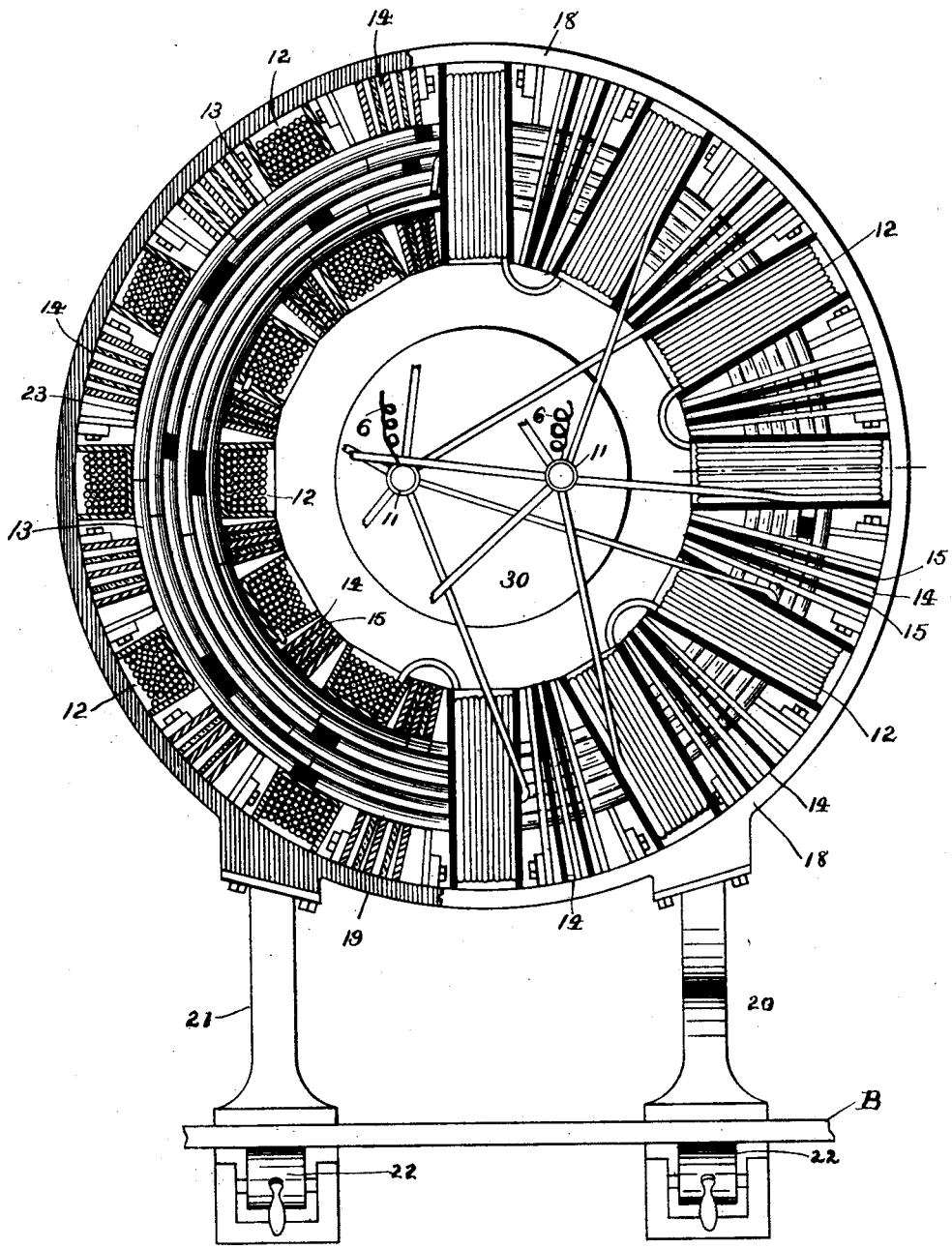
Figure 6:
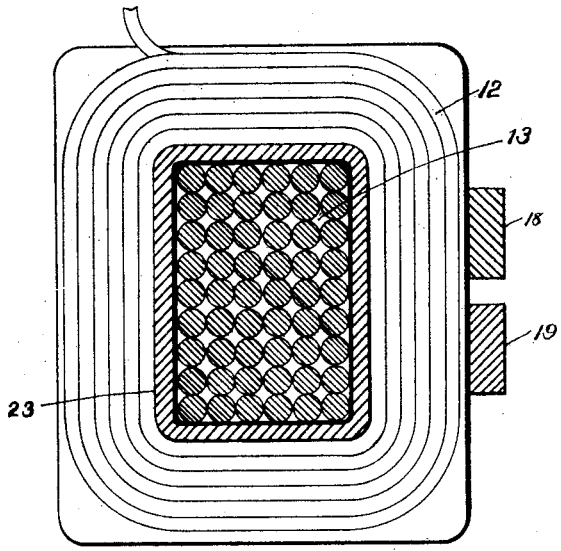
Figure 7:
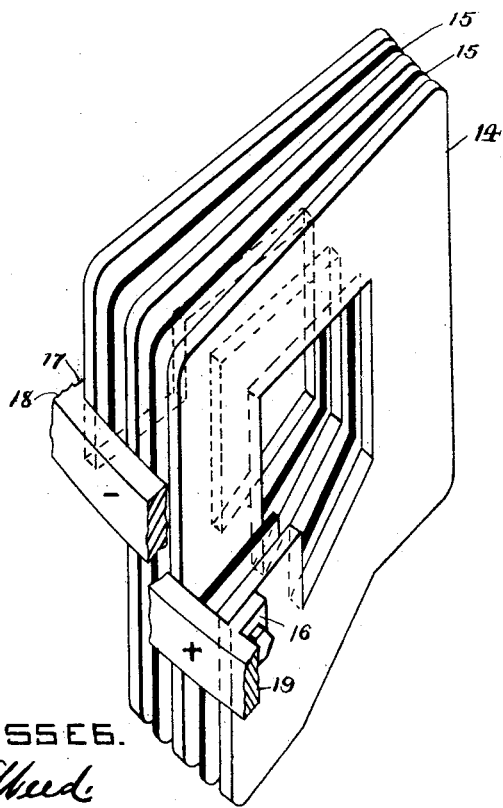
Figure 10:
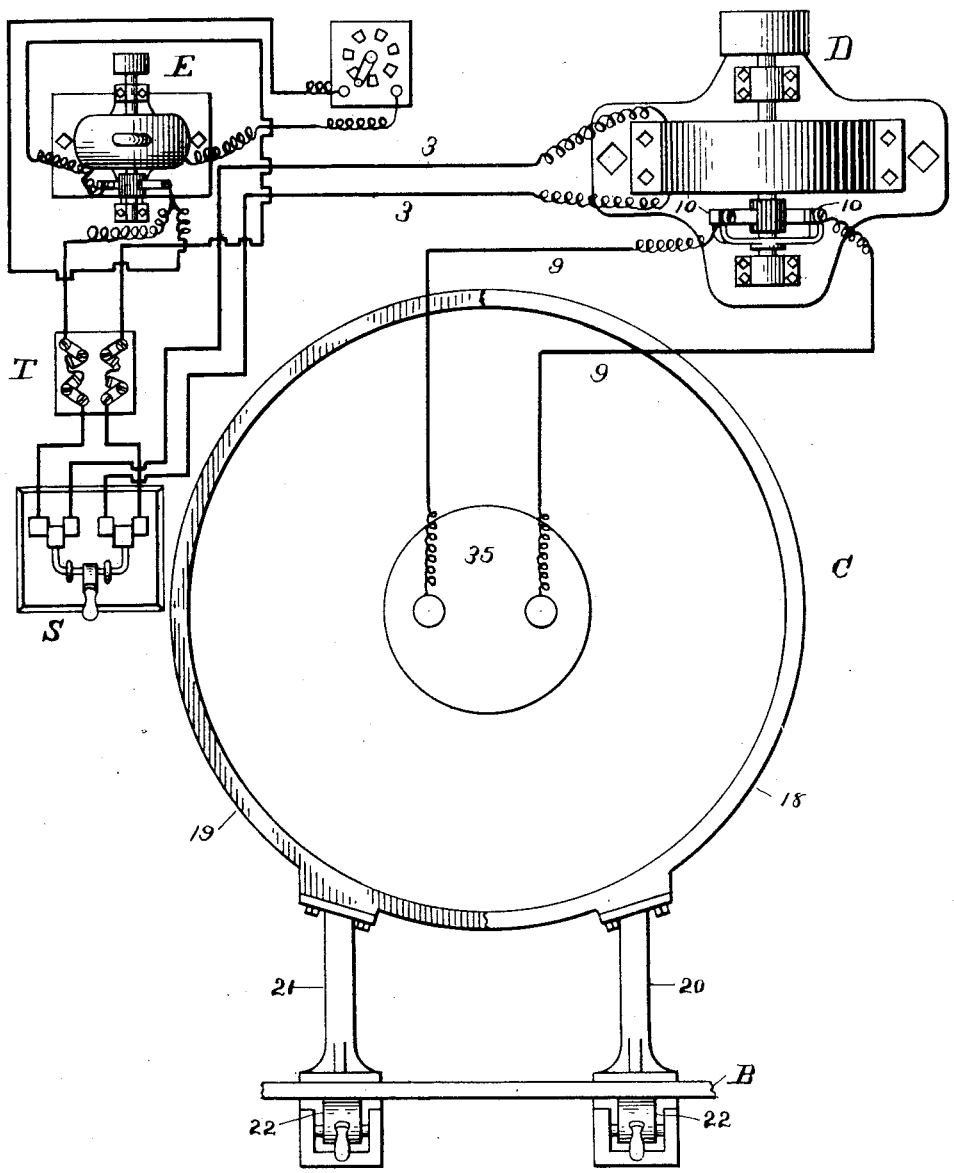

In the drawings, Figure 1 is a plan view of our mechanism with the electric connections and construction diagrammatically shown. Fig. 2 is a side view of the conducting rings and clamps removed from the converter. Fig. 3 is a front view of the same. Fig. 4 is an enlarged vertical section through one of the metal holders. Fig. 5 is an enlarged top plan view of the converter, partly in section, to show its construction and connections more clearly. Fig. 6 is a vertical section through the core and one of the windings of the primary coil of the converter enlarged. Fig. 7 is a perspective view of one of the windings of the secondary coils of the converter detached therefrom. Fig. 8 is an enlarged end elevation, partly in section, of the alternating dynamo, which furnishes the electric current to operate the mechanism. Fig. 9 is a side elevation of the exciter-dynamo, which is used to excite the field-coils of the dynamo. (Shown in Fig. 8.) Fig. 10 is a top plan view of the various mechanisms as they appear in their casings, with the rheostat located in a different position with relation to the converter.

Referring to the general plan of the series of mechanisms we use, E is the exciter-dynamo, which is used to excite the field-coils of the alternating dynamo D, which is in turn connected to the converter C, which transforms the dynamo-current of high electromotive force into the heavy heating-current of low potential, hereinafter described, which is used to heat the metal bar B, held in the metal-holders $c\ c$ of the converter.

R is the rheostat to control the heating-current, preferably located alongside of the converter.

S is the switch to throw the heating-current off or on.

T is the cut-out.

The method shown of connecting and constructing these various mechanisms is what gives their superior result, which is, as before stated, the heating of the iron bar B—say of three-fourths of an inch cross-section and eighteen inches long in the part heated between the metal-holders—to a welding-heat in thirty seconds.

The exciter-dynamo E has its armature 1 placed between the poles of its field-magnets 2 2, and is made to excite its own field and to furnish its current to the dynamo D. In order to control the heat with sufficient rapidity and effectively, the rheostat R is introduced into the series wound circuit of the field of the exciter-dynamo, and in this position is able to effectively control the heating-current in the bar B with a reasonable size resistance in the rheostat and with a small dial quickly operated, which control would be quite impossible in either the primary circuit of the dynamo D between it and the converter C or in the secondary circuit passing from the converter through the bar B. A brief consideration of the relation of these mechanisms will show why this is so. The exciter-dynamo E gives, for example, a working current in its field of one-fifth of two hundred and twenty volts, which is the normal current on its circuit leading to the alternating-current dynamo D. Under this excitation of its field-magnets the alternating-current dynamo D yields, on its circuit leading to the converter, a current of, say, sixteen hundred volts. This alternating current is transformed in the converter into a heavy heating-current of great volume and having a potential of from four and one-half to seven volts. It is obvious, therefore, that the rheostat in the exciter field-circuit, by reducing its current one volt, will effect a change of three hundred and twenty volts in the dynamo-current and will effect a corresponding change in the volume of the heating-current flowing through the bar B, and it is obvious that the rheostat can regulate the current by changing it the fraction of a volt in the exciter field-circuit, where it must change it many volts in the working-circuit of dynamo D, and where it must deal with an unknown and excessive volume of current in the secondary circuit of the converter; but it is also found that the rheostat when placed in the field-circuit of our apparatus organized as represented does much more than this. When the bar is placed in the metal-holders, formed and applied to the converter C, as shown, so as to take a wide bearing on each end of the bar, the metal does not heat in the holders, but begins to heat at each end about one-sixteenth of an inch inside of each one, and heats from thence progressively and rapidly toward its central part, as can be seen by the heat traveling along the bar. When the degree of heat desired is reached at the end parts, it is important for most operations of metal-working and indispensable to many that the part of the bar to be heated and worked shall have substantially the same working degree of heat and that the heat shall be capable of being so controlled as to impart this to the bar. Thus, if iron is to be lap-welded, the iron must be at a welding heat the whole length of the lap. If at one end of the weld it is too cold and at the other end heated so high as to "burn" or crystallize the iron fibers, an imperfect weld will result, and the work will be useless. If steel is to be tempered and the heat of one or both ends is above the middle, the tempering to an even cutting-edge will be impossible, because one part would be suitable only for cutting wood at a higher temper and the other only for cutting iron at a lower one. If wire is to be drawn hot, the more-heated part will draw down easier than the less-heated part, &c. Here is where previous apparatus for electric heating of metals has failed. The current sent through the converter or the storage battery or the dynamo, while it might have done for other electrical lighting or heating, would not heat the metal to the practically-even degree of heat throughout the lengths required for metal forging or similar working. In "electric welding," so called, the same difficulty manifests itself in another way. When the two ends of the rods or pieces to be joined are brought together, the electric current fuses the adjacent metal and forms a perfect union of it at that point, while half an inch or so back each way from it in each rod the metal remains cold; but between this cold part and the fused joint there will be found within this half-inch after it is cooled down fibers of metal (cross-wise of the bar) in all the different states to which the different intermediate degrees of heating have left them. Thus just back of the fused joint will be a transverse stratum of metal, which has been heated to that point just below fusing, where the metal crystallizes as it cools. When struck a sharp blow just here, the rod will break off, thus rendering the electric welding of little value by its crystallizing and weakening another part of the rod. This is due to the unequal heating of the metal in the different parts, owing to the want of power in the electric current to heat it evenly or the power to control and vary the current to have it do so. Now we find if the rheostat is introduced into the circuit leading to the fields of dynamo D from the exciter in our apparatus we fail to get a current which will heat the bar evenly as it would if placed as we have shown it. The heating of the bar in the ends or parts nearest the electrodes is always visible in advance of the heating at its middle part so much that an even heat is not attained by the direct action of the current upon the bar. This we attribute to two causes: first, the heating of the rheostat itself as the work goes on, and secondly, to the failure of the exciter to respond to the reaction of the heating of the bar upon it. When the rheostat is set to regulate the bar by a certain amount of resistance in a cold state, the heating of the rheostat will cause it to present a different degree of resistance, varying constantly as it heats up. This destroys the regulation of the current to a predetermined degree by it and prevents the result being attained with certainty; but what is more important is that we have discovered that the process of heating of the bar in the converter reacts upon the exciter-current with our arrangement and connection of the machines, substantially corresponding to the condition of the bar. Thus when the bar is introduced into the converter electrodes cold the voltage of the exciter-current rises in proportion to its amprage with the heating of the bar, which undoubtedly causes the converter to give out a current of greater energy in proportion to its volume continually as it is needed to overcome the increased resistance of the bar due to its heating. Thus the action and reaction of the exciter upon the bar and the bar while heating upon the exciter insures the continuing of the heating process until the bar is raised to an even heat. On the other hand, the introduction of the rheostat in the direct circuit leading to the field-coils of dynamo D prevents the voltage from rising with relation to the amprage, as described, because in this position the rheostat itself is an obstruction to the current which energizes the fields of dynamo D. We therefore conclude that no resistance in the circuit of the converter, primary or secondary, or in the main circuit of the exciter, which obstructs the current and heats or warms up under its action, should be permitted, and that the energizing influence of the exciter in producing a current of greater energy in response to the increased resistance of the bar as the latter heats up, which current can be regulated at will of the operator, depends upon the placing of the rheostat in the exciter field-circuit.

By our arrangement of mechanism, as above described, we have produced a heating-current of electricity having its voltage varying with relation to its amprage in such proportion that it can continue to heat the bar of metal until it brings its middle part to an even working heat with its ends first heated without in the meantime heating those ends above that heat or so as to injure the metal. Moreover, we regulate this current so as to bring the bar to any degree of heat desired for working it, as is required in the ordinary operations of working metals at the forge. We thus extend the application of heating metals by the electric current in new directions and are even able to work some metals hot which have never before been worked in that way.

Our process of heating all parts of the metal bar by the direct action of the electric current should be distinguished from those processes by which very short lengths of metal have heretofore been heated to an equal degree of heat at their ends and middle parts by the radiation of the higher heat of their ends conducted through the bar by its own conductivity, such ends having been heated by the application of a heating-current of electricity to them. Such equal heating of the middle and ends of a short metal bar by conductivity of the bar itself under a heating-current of electricity differs from our process in several particulars: First, it is much slower and more expensive, and, secondly, it is limited to such bars of metal as are short enough to allow the conductivity to act quick enough to prevent the radiation into the surrounding atmosphere from carrying off the heat faster than it can reach the center part of the bar.

Our invention is also distinguished from processes where the electric current is supplemented by external heat of other kinds or by jackets and muffles of various kinds to act on the part of the metal least heated by the electric current and bring its temperature up to that most heated. All such heating by radiation as an auxiliary to the direct action of the electric current in order to correct the unequal effect of the latter on different parts of the bar are slow and expensive, as well as limited in their application.

Our heating-current, which acts on the bar, must be capable of being regulated, so as to adapt it to different sizes and lengths of bars and to the different resistance of the same-sized bar when made of different metals or of different grades of the same metal. We can adjust our rheostat to vary the current to suit the size of the bar, so as not to unduly heat or destroy one part of it before another is heated to the right point. Thus a current of electricity which would properly and evenly heat an iron bar three-fourths inch in diameter and five and one-half inches long will burn and injure the ends of a bar of like length and only one-half inch in diameter. Through all the changes of the rheostat and electric current, however, the current in the main circuit of the exciter must be made while the bar heats to maintain a relative proportion of voltage to the amprage according to the stage of heating to effect the proper and economical heating of the bar in the metal holders. This relation of the voltage to the amprage would doubtless be of comparatively little importance when the current of the converter was employed for other purposes than the heating of metals for metal working, as herein described; but for that purpose it is all important.

For the purpose of instructing the operator in the production of the effective current which we employ to heat a bar of iron evenly and so that he may know when all the apparatus is in proper condition and working effectively, we give the following actual tests in heating the bar of steel three-fourths of an inch in diameter and five and one-half inches long. Starting with a resistance which gave an exciter-current of sixty volts to one and one-half ampères with the bar cold in the electrodes, the voltage rose to sixty-eight and one-fourth as the heating progressed, until when the bar was evenly heated white-hot it dropped back slightly. On the other hand, with the same resistance in the main exciter-circuit, starting with the voltage at fifty-seven to one and one-half ampères, it dropped to fifty volts when the heating had progressed so far that the ends of the bar were red-hot, while the middle was black, and then to forty-eight volts when the ends of the bar became white-hot, while the middle was of a dull red heat. It is manifest that the current of the exciter must be transformed into a different current by the converter in the first case than in the last one and that the difference in result is attributable to that, although as there is no known method of measuring the current produced by our converter we are compelled to infer the difference in it from measurements of the exciter-current. The exciter is of course a direct-current machine, as it requires that current to excite the fields of the alternating-current dynamo D.

One part of our invention may therefore be summed up as consisting of the discovery, when the primary and secondary circuits of the converter and the field-coil circuit of dynamo D are freed from heating resistance, which will interfere with the current, and the rheostat is so located as to not interfere with the current, but to regulate the exciter and cause it to give out its current of varying intensity proportionate to the work to be done, that we can produce a regulable current which will automatically maintain such relation of its voltage to its amprage, as the metal-heating progresses, as to heat the metal to a substantially even working heat in all the part through which the current flows.

It is not absolutely necessary in using this apparatus to arrange the electrode-clamps so that the metal will commence to heat at two points between them simultaneously, as one clamp may be so arranged as to cause the heating to begin first at the point nearest to it—as, for example, by making its contact-surface on the metal bar less than that of the other clamp, and the heating action of the current will then extend the length of the bar through which the current passes.

While, therefore, a simple and ordinary rheostat of proper construction will delicately and quickly regulate the heating effect of the apparatus when placed in the exciter field-circuit, it is obvious that it must be much more complicated and expensive in construction, as well as fail to do the same work when placed in either the working circuit of the dynamo D or the secondary circuit of the converter, constructed as we show it. Besides this it is found that if the rheostat be placed in the circuit between the alternating dynamo and the converter, or even in the main exciter circuit, any attempt to use the rheostat to regulate the current so as to control the heat in the bar B at once interposes such resistance in that circuit as to heat the rheostat and lower the voltage, so as to arrest the progress of the heat through the bar B. This is due to the fact, as we believe, that the resistance of the rheostat, causing it to heat, varies its resistance very rapidly beyond the control of the operator. In other words, it ceases to be a controllable rheostat, and as the bar B requires a higher voltage to be developed as it gets hotter in the current from the secondary coil of the converter instead of a lower voltage, so that the rheostat in the main circuit operates against the requirements of the process to be performed. It is also found that the rheostat when placed in the secondary circuit of the converter is utterly incapable of regulating the current of such immense volume and low potential as our mechanism produces, so as to heat the metal evenly and control its heating, and we have not as yet discovered any means of making and applying a rheostat which will deal practically with that current and allow it to produce the heating effects which we have described.

The circuit 3 of the exciter-dynamo E leads from the commutator-brushes to the connections 4 5 of the field of the alternating dynamo. The rheostat R is in a shunt of the circuit leading from the poles of the commutator-brushes through the field-coils. The circuit 3 3 passes from the exciter through the cut-out T and the switch S to the connections 4 5 to the terminals of the circuit passing through the field-coils of the dynamo D. The necessary screw-cups for this purpose are attached to the frame-work of the dynamo D, and are also provided upon the frame-work of the exciter dynamo E, as shown in Figs. 9 and 10.

In the heating and tempering of metals it is necessary to control the heat in the bar B with great delicacy and rapidity—as, for instance, when a welding heat is required—as a higher heat would burn the bar and destroy its welding properties. This is because the electric current used to heat the bar must have a given maximum amprage proportioned to the size of the bar to prevent its burning one part of the metal of the bar before it heats the other parts, and it must also have a given minimum voltage to continue to drive the current through the bar until all the parts are heated, and this maximum amprage and minimum voltage bear a certain relation to each other in order to do the work required. Therefore it is necessary that the operator should be able to judge by the color of the metal as to the effect of the electric current upon it and to regulate the latter at once from such judgment. Hence the rheostat R is placed within reach of the operator heating the bar in the converter C and connected by wire with the shunt of the exciter field-coils, as shown in Fig. 1. The regulation of the current by this means is rendered easy and instantaneous without interposing any resistance in any of the circuits which will counteract or destroy the relative potential of the current exerted upon the bar B as governed by the heating process or the shifting of the pointer or arm of the rheostat.

6 6 are the field-coils of the alternating dynamo D, which are in circuit with the exciter. These coils are alternately wound in opposite directions, as shown, so as to be alternately positive and negative and so as to have the diametrically-opposite coils of the field positive and negative. The armature 7 of the alternating dynamo D is provided with an equal number of pole-pieces or projections to the field-coils within which it rotates; but only every other one of these armature pole-pieces or projections of its core is wound with a coil of wire, the successive winding being made in same direction. This feature of having one-half of the pole-pieces of the armature-core unwound is considered important, as the magnetism is conveyed by the field more freely to the armature-core than if all the pole-pieces of the core had currents of electricity passing around them when brought opposite to the cores of the field-coils, and the result is the production of pulsations of electricity in the armature-coils 8 8 of the alternating dynamo peculiarly adapted to be converted into a current of a different potential in the converter C, to which these electric currents pass over the electric circuit 9 9, which leads from the collecting-brushes 10 10 of the alternating dynamo.

To the terminals 11 11 of the circuit 9 9 in the converter the primary circuit-coils 12 12 of the converter are connected in series parallel in pairs of two—that is to say, the coils of each pair are in series with each other and in parallel with every other pair. These coils 12 12 of the primary circuit consists of comparatively fine wire placed or wound around an annular core 13 of the converter, which is of peculiar construction. It consists of sections or segments of uninsulated wire formed into a ring by laying the wires side by side, so that the ends break joints, and so that while the lines of force generated in the core by the primary coils 12 12 flow around the core continuously and pass freely across both outward, inward, and sidewise to the adjacent wires they are broken up by the disconnected ends of the wires forming the core, as shown more clearly in Fig. 5. This augments the inductive action of the core on the secondary coil and accomplishes the conversion of the electric current with much less loss of energy than in other methods heretofore attempted where currents of such low potential and great volume as we use are required in the secondary coil, and also prevents the heating of the core during the inductive action.

The primary coils 12 12 are all wound on spools in the same direction around the core 13, and between them are placed the secondary coils 14, which are also wound around the core and consist of sheets or plates of copper or other suitable conducting material so cut or formed that they present themselves edgewise to the core, and their breadth transversely of the core shall be much greater than their thickness in the direction of the core or of their exposed faces to the core. These coils of the secondary conductor 14 are separated by sheets of insulating or non-conducting material 15, and have their terminals 16 17 respectively connected to the conducting-rings 18 19, which surround the coils and core of the converter, Figs. 2, 3, and 7. It will thus be seen that the secondary coils are connected to these rings in parallel or multiple arc, conveying positive electricity to the one and negative electricity to the other.

From the ring 18 the arm 20 projects outward, carrying on its end a metal-holder, and from the ring 19 the arm 21 projects outward, so that its outer end and metal-holder is brought parallel with that of arm 20. Thus when the bar B is inserted in these arms and placed in position it completes the secondary circuit. The metal-holder is formed of a simple eccentric 22, having a handle and turning on pivots journaled in the end of the arm, so as to grip the bar B against a face of the latter. Any form of metal-holder may be employed.

The primary coils 12 are of insulated wire and are carefully insulated from the wires of the core 13 by a sheet of non-conducting fiber 23, and the secondary coils are insulated from the core in the same manner.

By forming the conducting-rings 18 19 continuous they not only form a double conduit for the electricity from the respective terminals of the secondary coils attached to them, but they also induce currents of opposite polarity in each other, respectively, when the circuit is completed by the insertion of the bar B, and thus inductively reinforce the current delivered to them by the converter, since the current will be flowing continuously around each endless ring. It also appears probable that these continuous endless rings and the continuous annular core inside of them act and react on each other by induction and also upon the circuits of dynamo D and of the exciter to vary and regulate the potential of the current delivered through the bar B as it is required to heat the bar, furnishing a current of lower potential and greater heating power when the heating of the bar is begun and its resistance is comparatively low to the passage of the current and furnishing a current of higher potential as the bar becomes heated and its resistance increases and more electric energy is required to force the current through the bar, and by this alternate weakening and strengthening the potential of the secondary current, as required, the heating effects are accomplished until the bar is melted. These rings may have more than one pair of arms 20 21 with their attached metal-holders, such duplicate arms being located on various sides of the converter-rings, so as to permit access thereto of several workmen engaged on different classes of work which they desire to have heated, and it will be found that such different classes of work may be carried on with the same converter having different or separate arms connected thereto, because as bar B in one pair of metal-holders begins to heat the increased resistance throws a greater current of electricity into the work held in the second pair of arms and metal-holders and heats that, so that the excess of power required to operate the several pairs of heating metal-holders is only slightly in excess of what is required to heat the bar in one pair of metal-holders when used alone. Such excess required is equivalent to the small proportion of electric current which is demanded by the bar which first becomes heated. This method of successively heating several bars in metal-holders applied to the same converter also enables the workman to be performing his forging while several other pieces of work are successively being heated in a converter having a multiplicity of pairs of metal-holders, and the workman may thus regulate the speed at which the successive pieces of work arrive at a forging heat by introducing various numbers or sizes of other pieces of work into the other metal-holders of the converter and carrying on the heating of the same simultaneously. These several pairs of metal-holders might be attached to a single pair of arms, instead of being on different pairs, and produce similar effects in conducting the process of working the metals.

The variations in the potential of the secondary circuit are believed to correspond with the greater or less resistance of the iron bar B in the different stages of heating, and it is also accomplished by a corresponding variation in the potential of the primary working circuit of the alternating dynamo—that is to say, when the secondary current of high amprage is flowing with the greatest case through the bar B the voltage of the working-circuit current of the alternating dynamo and that of the exciter-circuit are reduced—but when the resistance of the bar B becomes greater, checking the flow of the great volume of current in the secondary circuit of the converter, the voltage of the dynamo-current increases, the dynamo itself being run at the same speed continuously through the whole operation.

Referring more particularly to the construction of the converter, it will be seen that the conducting-rings 18 19 are held apart by having their internal projecting flanges bolted to the terminals, respectively, of the secondary coil, so that all negative terminals shall be bolted to one ring and all positive ones to the other, and thus sustain the rings apart, because the whole strain comes edgewise on the plates forming the secondary coils 14; also, that the secondary coils embrace the core by intervening insulating material, so as to keep it in position with relation to the rings; also, that the primary coils are wound around and supported upon the core by insulating material.

It will be seen that with the converter constructed of two continuous outer rings it is perfectly feasible to employ it to heat short pieces of metal by simply holding them with tongs, so that their opposite ends on one side make contact with the rings, or by pressing them against the rings by any other means, so as to make such contact. The metal pieces will be quickly heated in the parts between the rings in this way, and as the rings are continuous it will not matter at what part of them the metal pieces are applied to be heated, as it might if they were broken at some place on the circumference.

In the middle of the converter the terminals 11 11 are supported upon the wooden block 30, and the series of insulated wires of the primary circuit, which attach the coils 12 12 to these terminals, sustain this block 30 in position. Thus the converter becomes a homogeneous structure, only requiring to have the circuit-wires 9 9 connected to its terminals to be ready for use.

Although we show and describe in this specification the two pairs of arms 20 21 attached to the rings 18 19 of the converter, it is not intended in this specification to claim that specific adjustment of the two pairs of arms, but only the connection of two pairs of metal-holders and holding-arms, broadly, when connected in multiple arc to electrical conduits leading from the converter-rings 18 19.

Any equivalent of an alternating dynamo—such as an intermittent or pulsating dynamo—may be used, and the claims are to be understood as including these equivalents.

What we claim as new and of our invention is—

1. The combination of an electric converter for converting electric currents of high potential into those of low potential by induction, provided with metal-holders in its secondary circuit arranged to hold therein the article to be heated, an alternating-current dynamo connected to the primary circuit of said converter, an exciter-dynamo connected to the field-coils of said first dynamo and arranged to energize the field-magnets thereof, and a rheostat interposed in the electric field-circuit of said exciter-dynamo and adapted to regulate the current of excitation of the fields of said first dynamo, substantially as described.

2. The combination of an electric converter for converting electric currents of high potential into those of low potential by induction, provided with metal-holders in its secondary circuit arranged to hold therein the article to be heated, an alternating dynamo connected to the primary circuit of said converter, an exciter-dynamo connected to the field-coils of said first dynamo arranged to energize the field-magnets thereof and having a shunt-circuit from its armature-brushes through its own field-coils, and a rheostat interposed in said last-named shunt-circuit adapted to regulate the excitation of the fields of the exciter-dynamo, substantially as described.

3. The combination of an electric converter for converting electric currents of high potential into those of low potential by induction, provided with metal-holders in its secondary circuit arranged to hold the article to be heated, an alternating-current dynamo connected to the primary circuit of said converter, an exciter-dynamo connected to the field-coils of said first dynamo and arranged to energize them, and a rheostat located within reach of the operator engaged in heating the metal in said metal-holders and connected in the field-circuit of said exciter-dynamo and arranged to regulate the current in the same, substantially as described.

4. The combination of an electric converter for converting electric currents of high potential into those of low potential by induction, provided with metal-holders in its secondary circuit arranged to hold the article to be heated, and an alternating-current dynamo connected to the primary circuit of said converter and constructed with a series of field-coils upon its field-magnets and with coils upon every alternate pole of the armature, whereby the latter coils are respectively located on the opposite side of the armature from poles having no coils, and a source of electrical energy connected to said field-coils and arranged to excite the same, substantially as described.

5. The combination of an electric converter for converting electric currents of high potential into those of low potential by induction, provided with a pair of metal-holders in its secondary circuit arranged to hold therein the metal to be heated, an alternating-current dynamo connected for supplying current to the primary circuit of the said converter, and a source of electrical energy connected for supplying an energizing-current to the field-magnets of the alternating-current dynamo, with means operative in connection with and through the said energizing agency for regulating and maintaining the due proportion of amprage to voltage in the alternating current during the heating process by variations produced at will in the said energizing-current, whereby the temperature of the metal between the holders may be first raised to a predetermined working heat at one or more points and then successively raised in all other parts to the desired working heat, substantially as specified.

6. In an apparatus for heating metals by electricity for working or shaping said metals, the combination of an alternating-current dynamo, a source of electrical energy connected to the circuit of the field-coils thereof, means for regulating and maintaining the proportion of voltage to amprage in the alternating current of said dynamo during the heating operation, substantially as described, an electric-current converter for converting a current of high potential into a current of low potential by induction, having a core 13, primary coils 12, connected in circuit with said alternating dynamo by conductors 9, secondary coils 14, composed of spiral plates, rings 18 and 19, surrounding said core, the opposite terminals of the secondary coils being connected, respectively, to said rings, so that one of said rings forms a positive terminal of the induced current and the other ring forms a negative terminal of said current, a metal-holder having electrode terminals, and conductors connecting the terminals of said metal-holder with said rings, respectively, for passing the current through the metal to be heated, substantially as set forth.

7. The combination, in an electric converter for converting electric currents from one potential to another by induction, of an annular core formed of lengths of uninsulated or partially-insulated wire arranged side by side and breaking joints at various intervals in the circuit of the core, primary circuit-coils surrounding segments of said core, and secondary circuit-coils surrounding segments of said core between the primary coils, substantially as described.

8. The combination, in an electric converter for converting an electric current from a high to a low potential by induction, of an annular core, primary circuit-coils surrounding segments of said core, and secondary coils composed of plates of metal of greater diameter transversely to the core than in the direction of its length and disposed radially around segments of said core between the primary coils and with their broader faces adjacent to the latter, substantially as described.

9. The combination, in an electric converter for converting electric currents from one potential to another by induction, of the primary circuit-coils 12, the annular core 13, and the series of secondary coils 14, having their positive and negative terminals respectively connected to curved conductors 18 and 19, surrounding said core externally and lying substantially parallel thereto, and having metal-holders for holding the work and completing the circuit connected thereto, respectively, substantially as described.

10. The combination, in an electric converter for converting electric currents from one potential to another by induction, of the primary circuit-coils 12, the annular core 13, and the series of secondary coils 14, having their positive and negative terminals respectively connected to ring-conductors 18 and 19, lying substantially parallel to each other and respectively having metal-holders for holding the work and completing the circuit connected thereto, substantially as described.

11. The combination, in an electric converter for converting electric currents from one potential to another by induction, of the primary circuit-coils 12, the annular core 13, and the series of secondary coils 14, having their positive and negative terminals respectively connected to ring-shaped conductors 18 and 19, surrounding said core externally and lying substantially parallel to each other, and respectively having clamps for holding the work and completing the circuit connected thereto, substantially as described.

12. The combination, in an electric converter for converting electric currents from one potential to another by induction, of the primary circuit-coils 12, arranged with two coils forming each pair in series and with each series pair in multiple arc in the primary circuit, such coils surrounding the core or some part thereof, the secondary coils also surrounding the core between the primary coils and connected in the secondary circuit in multiple arc, and the terminals of the secondary circuit provided with metal-holders for holding the work to be heated in the circuit.

13. The combination, in an electric converter for converting an electric current from a higher potential to a lower one by induction, of an annular core, a primary coil or coils disposed around a segment or segments of said core, and a series of coils surrounding segments of said core and connected in multiple arc to the secondary circuit, each of said last-named coils consisting of a plate of metal disposed radially and surrounding a segment of said core and presenting its thin edge thereto, substantially as described.

14. The combination, in an electric converter for converting electric currents from a higher potential to a lower one, of the primary circuit-coils 12, the core 13, the secondary coils 14, and the ring-shaped conductors 18 and 19, respectively connected to the terminals of the secondary coils and respectively carrying the metal arms 20 and 21, rigidly projecting therefrom and supported thereby and provided with metal-holders for holding the bar to be heated, substantially as described.

15. The combination, in an electric converter for converting electric currents from a higher potential to a lower one by induction, of the outer rings 18 19, forming positive and negative electrical conductors, the secondary coils 14, having their terminals respectively attached thereto and surrounding and sustaining the core 13 by interposed insulating material, and the insulated primary circuit-coils also surrounding and sustained by the core, forming a complete inductorium, substantially as described.

16. The combination, in an electric converter for converting electric currents by induction from a higher to a lower potential, of the annular core 13, the primary and secondary coils surrounding the same, and the central plate of non-conducting material arranged within the core to receive the terminals 11 11 of the primary circuit and the connections thereto of the primary coils 12 12, substantially as described.

17. An electric converter for converting electric currents by induction from a higher to a lower potential, provided with two continuous rings of different polarity disposed on the outside of the converter and connected with opposite terminals of the secondary coils thereof.

18. In an electric metal-heating apparatus, the combination of a converter for converting electric currents from a higher to a lower potential, provided with rings of opposite polarity connected to opposite terminals of the secondary coils and disposed on the exterior of the converter, and metal-holders connected with said rings for holding the metal to be heated.

19. The combination, in an electric converter for converting electric currents from a higher potential to a lower one, of the primary circuit-coils 12, the core 13, the secondary coils 14, and the ring-shaped conductors 18 and 19, respectively connected to the terminals of the secondary coils and respectively carrying metal arms on different sides thereof rigidly projecting therefrom, each pair of which arms on a different side is provided with metal-holders arranged to receive the metal to be heated and to permit the same to be handled without interfering with the work being done in any other pair on a different side, substantially as described.

GEO. D. BURTON.
ARTHUR H. EDDY.
GEO. T. BRIGGS.

Witnesses to signature of George D. Burton:
CHESTER MARR,
R. W. GALLUPE,

Witnesses to signatures of Arthur H. Eddy and George T. Briggs:
ARTHUR D. NEWTON,
ARTHUR L. BRIGGS.